F. V. HETZEL.
ROLLER OR LIKE MACHINE ELEMENT.
APPLICATION FILED JAN. 11, 1919.

1,372,510.

Patented Mar. 22, 1921.

Inventor
Frederic V. Hetzel
by his Attorneys

UNITED STATES PATENT OFFICE.

FREDERIC V. HETZEL, OF INDIANAPOLIS, INDIANA, ASSIGNOR TO LINK-BELT COMPANY, OF CHICAGO, ILLINOIS, A CORPORATION OF ILLINOIS.

ROLLER OR LIKE MACHINE ELEMENT.

1,372,510.     Specification of Letters Patent.     Patented Mar. 22, 1921.

Application filed January 11, 1919. Serial No. 270,697.

*To all whom it may concern:*

Be it known that I, FREDERIC V. HETZEL, a citizen of the United States, and a resident of Indianapolis, county of Marion, State of Indiana, have invented certain Improvements in Rollers or Like Machine Elements, of which the following is a specification.

My invention relates to certain improvements in rollers or wheels of the type which contain lubricant and which are designed to rotate freely on a spindle or axle. In rollers of this type, it is common practice to make the rollers hollow and to provide an annular felt washer through which the lubricant passes from the interior of the wheel to the spindle or axle.

The object of my invention is to provide a roller or wheel of such character with a chilled surface at the hub and to design the hub so that the slot, or slots, for the lubricant will be utilized as a means to allow for the expansion of the hub when the parts are cooling after casting.

Figure 2:
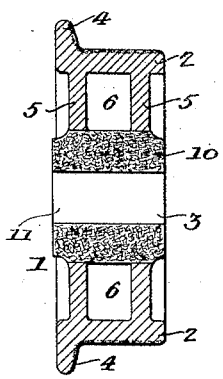
Figure 1:
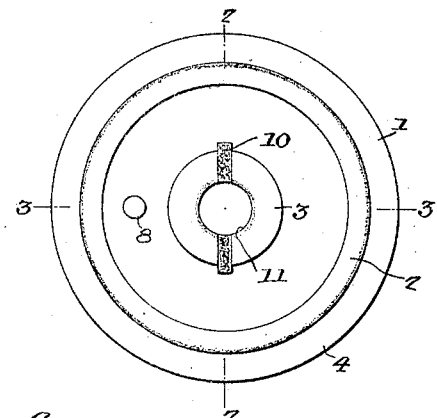
Figure 3:
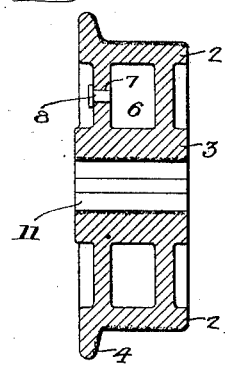
Figure 4:
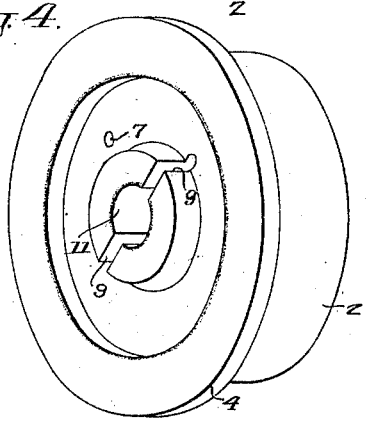
Figure 7:
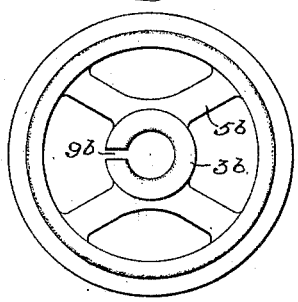
Figure 6:
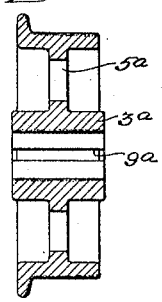
Figure 5:
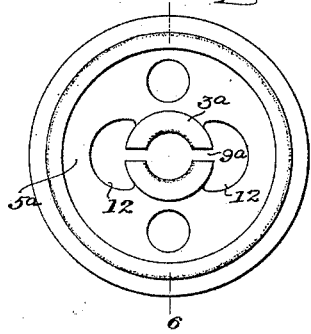

In the accompanying drawings:

Figure 1 is a face view of my improved roller, or wheel; Fig. 2 is a sectional view on the line 2—2, Fig. 1; Fig. 3 is a sectional view on the line 3—3, Fig. 1; Fig. 4 is a perspective view of the wheel after it is cast and before the felt strips are placed in position; Fig. 5 is a face view of a roller having a single plate; Fig. 6 is a sectional view on the line 6—6, Fig. 5; and Fig. 7 is a view of a roller having spokes and showing a single slot in the hub.

1 is a roller having a rim 2 and a hub 3, and, in the present instance, there is a flange 4, but the roller may be made without the flange, if desired. 5, 5 are two plates spaced apart so as to form a cavity for a lubricant. 7 is an opening closed by any suitable plug 8. The periphery of the rim of the wheel is preferably chilled by the usual process and I find that it is also desirable to chill the wall of the opening 11 of the hub. Under ordinary conditions, it is practically impossible to chill the hub, as it is difficult to withdraw the chill mandrel unless it is cut away by boring. The broad idea of chilling the hub and allowing the hub to expand, while the rim contracts, is fully set forth in a companion application filed January 11, 1919. In this companion application, the hub is reduced at one or more points to form weak portions, which crack during the cooling process, but, in the present instance, I form well defined slots 9, which extend radially entirely through the hub and partly into the plates 5, as clearly shown in Figs. 1 and 4. These slots extend the full length of the hub so that when the roller is cast within a chill surrounding the rim and with a chill mandrel, the casting is allowed to cool and to contract at the rim, while the hub will expand during the cooling process, owing to the two parts being separated by the slots, so that the chill mandrel can be readily removed, leaving an opening 11 of an even diameter throughout.

I utilize the slots to provide a channel which will form communication between the cavity 6 and the opening 11 and in order to prevent the rapid flow of lubricant through the passages, I pack these passages with felt 10, or equivalent material, through which the lubricant will pass slowly from the cavity 6 to the bearing of the spindle on which the wheel is mounted, and while the slots 9 act to release the chill mandrel after casting, they also act as a means of communication between the cavity and the bearing surface of the spindle, or axle, on which the roller is mounted.

My invention is especially adapted for use in conveying machinery where it is difficult to lubricate the bearing surface of the rollers, but it will be understood that the invention can be used on other wheels, or machine elements. In some instances, the wheel may be a single plate, as illustrated in Figs. 5 and 6, and the hub $3^a$ may be made in two different sections separated by an open slot $9^a$. The plate may be cut away sufficiently, as at 12, to allow the hub to shrink from the chill mandrel during the cooling process.

In Fig. 7, I have illustrated a construction in which spokes $5^b$ are used instead of the plate, or plates, and in which there is a single slot $9^b$ instead of two slots. It will be understood that one, two, or more slots may be used, depending upon the character of the machine element and the size of the hub.

I claim:

1. A roller, or other machine element, having a continuous rim; a hub and a connection between the hub and the rim, the parts being integrally connected, the hub having a longitudinal opening therein of an even diameter throughout, and having a longitudinal slot extending entirely through the hub, the walls of the opening in the hub being chilled, the slot allowing the hub to expand when cooling to allow for the removal of the chill mandrel.

2. A roller, or other machine element, having a chilled continuous rim; a hub integrally connected to the rim, and having a longitudinal opening therein extending the full length of the hub, the walls of the opening being chilled, the hub being separated into two parts by a well-defined space between the parts which communicates with the opening, the opening in the hub being of an even diameter throughout.

In witness whereof I affix my signature.

FREDERIC V. HETZEL.